United States Patent
Cho et al.

(10) Patent No.: US 6,681,302 B2
(45) Date of Patent: Jan. 20, 2004

(54) PAGE OPEN HINT IN TRANSACTIONS (75) Inventors: James Y. Cho, Los Gatos, CA (US); Kwong-Tak A. Chui, Cupertino, CA (US); Chun H. Ning, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 10/323,381

(22) Filed: Dec. 18, 2002

(65) Prior Publication Data

US 2003/0126383 A1 Jul. 3, 2003

Related U.S. Application Data (63) Continuation of application No. 09/665,981, filed on Sep. 20, 2000, now Pat. No. 6,526,483.

(51) Int. Cl.⁷ .............................................. G06F 12/00
(52) U.S. Cl. ...................................................... 711/154
(58) Field of Search ............................... 711/104, 105, 711/154, 168

(56) References Cited

U.S. PATENT DOCUMENTS

| | | |
|---|---|---|
| 5,253,214 A | 10/1993 | Herrmann |
| 5,371,870 A | 12/1994 | Goodwin et al. |
| 5,388,247 A | 2/1995 | Goodwin et al. |
| 5,461,718 A | 10/1995 | Tatosian et al. |
| 5,485,589 A | 1/1996 | Kocis et al. |
| 5,587,964 A | 12/1996 | Rosich et al. |
| 5,659,713 A | 8/1997 | Goodwin et al. |
| 5,664,153 A | 9/1997 | Farrell |
| 5,848,025 A | 12/1998 | Marietta et al. |
| 6,003,111 A | 12/1999 | Holman et al. |
| 6,052,134 A | 4/2000 | Foster |
| 6,199,138 B1 | 3/2001 | Jeddeloh |
| 6,212,598 B1 | 4/2001 | Jeddeloh |
| 6,219,765 B1 | 4/2001 | Jeddeloh |
| 6,526,483 B1 | 2/2003 | Cho et al. |

OTHER PUBLICATIONS

Halfhill, "SiByte Reveals 64–bit Core for NPUs," Microprocessor Report, Jun. 2000, pp. 45–48.
U.S. patent application Publication US 2001/0013082, Aug. 9, 2001, Jeddeloh, 5 pages.
"M68040 User's Manual," 1993 Motorola XP002184175, Chapter 4, pp. 4–1 to 4–18 and 5–1 to 5–17.

*Primary Examiner*—Hiep T. Nguyen
(74) *Attorney, Agent, or Firm*—Lawerence J. Merkel (57) ABSTRACT

A system including an agent and a memory controller, in which the agent may initiate transactions targeting a memory to which the memory controller is coupled and the transactions may include a page hint indication. The page hint indication is transmitted during the transaction by the agent, and may be an indication of whether or not the page addressed by the transaction should be kept open or closed. The memory controller may receive the page hint indication. When accessing the storage location(s) in the memory in response to the memory transaction, the memory controller may close the page or keep the page open responsive to the page hint indication.

21 Claims, 7 Drawing Sheets

PAGE OPEN HINT IN TRANSACTIONS

This is a continuation of U.S. patent application Ser. No. 09/665,981, filed on Sep. 20, 2000 now U.S. Pat. No. 6,526,483.

BACKGROUND OF THE INVENTION

1. Field of the Invention

This invention is related to the field of memory systems and, more particularly, to page mode memory systems.

2. Description of the Related Art

Memory systems typically include dynamic random access memory (DRAM) of one type or another. DRAM may include asynchronous DRAM, synchronous (SDRAM), double data rate SDRAM (DDR SDRAM), SyncLink DRAM (SLDRAM), Rambus DRAM (RDRAM), etc. Generally, DRAM memory is an array of storage locations arranged into rows and columns. To access (e.g. read or write) a given storage location in the DRAM, the DRAM receives a row address selecting the row including the storage location and a column address selecting the column including the storage location. Each storage location may be capable of storing one or more bits. The row and column addresses are typically multiplexed onto a set of address lines. Thus, a DRAM storage location may be accessed by transmitting the row address on the address lines and subsequently transmitting the column address on the address lines.

To allow for reduced latency if several storage locations in the same row are accessed consecutively, most DRAMs support a page mode. In page mode, the row address is transmitted to the DRAM, followed by the column address of the first storage location to be accessed. Then, to access additional storage locations in the same row, the column addresses of the additional storage locations may be transmitted without retransmitting the row address. Thus, the additional storage locations may be accessed in less time than the initial storage location, since the row address does not have to be transmitted each time. The storage locations selected by one row address are referred to herein as a "page". Keeping the page selected, so that only column addresses are used to access other storage locations in the page, is referred to as keeping the page open, and deselecting the row so that a new row address is transmitted to access a storage location is referred to as closing the page. Some DRAMs, such as SDRAMs, include banks of rows and columns. In such DRAMs, the page may be one row within one bank. While a page has been described with respect to DRAMs, a page may refer to storage locations in any memory which selects a storage location for access in response to a row address and a column address.

Operating in page mode is not without penalty, however. Particularly, page mode is maintained by keeping the page within the DRAM selected. In asynchronous DRAMs, the row is selected by activating a row address strobe (RAS) signal and sending the row address on the address lines. In synchronous DRAMs, an activate command is transmitted to the DRAM along with the row address. In response to the row address, the DRAM reads the page into a temporary storage location coupled to the DRAM memory (e.g. the senseamps used to sense the data in the storage locations or some other clocked storage device). The page remains in the temporary storage as long as the page is open (e.g. as long as RAS remains activated, in an asynchronous DRAM, or until a command is sent to close the row, in a synchronous DRAM). Thus, if access to a storage location in a different page is desired, that access is delayed while the previous page is closed (by deasserting RAS or by sending the command to close the row). Time elapsing while the previous page is closed increases the latency of that access, as compared to if the page had been closed at the completion of the previous access.

Typically, memory controllers have been configured to enable or disable page mode, and may have been programmable with various page mode policies. However, the existing mechanisms generally do not allow fine grain control over whether a page corresponding to a given memory access should be kept open or not. Thus, pages may frequently be closed when it would have been advantageous to keep them open and pages may frequently be kept open when it would have been advantageous to close them.

SUMMARY OF THE INVENTION

The problems outlined above are in large part solved by a system including an agent and a memory controller as described herein. The agent may initiate transactions targeting a memory to which the memory controller is coupled (e.g. the memory may be some form of DRAM). Memory transactions may include a page hint indication. The page hint indication is transmitted during the transaction by the agent, and may be an indication of whether or not the page addressed by the transaction should be kept open or closed. In other words, the indication may be a hint by the agent regarding the closing or keeping open of the page. An agent may indicate that the page should be kept open if an additional transaction or transactions within the same page of memory are likely (e.g. if the agent itself is going to transmit or may transmit additional transactions within the same page). In such cases, the agent may indicate, via the page hint indication, that the page should be kept open. The additional transactions may experience page mode hit latencies. In other cases, the agent may indicate that the page should be closed. Additional transactions to other pages may not experience the latency required to close the page, if the page is closed in response to the hint. The system may experience reduced overall memory latency due to the more efficient use of page mode.

The memory controller may receive the page hint indication. When accessing the storage location(s) in the memory in response to the memory transaction, the memory controller may close the page or keep the page open responsive to the page hint indication. Thus, fine grain control of which pages are kept open and which pages are closed may be provided. That is, each agent may indicate, on a transaction by transaction basis, whether given pages should be kept open or closed. Since the requesting agent may have some information about whether or not additional transactions are likely to that page and may transmit a page hint indication accordingly, pages may more often be kept open when it would be advantageous to do so, and may more often be closed when it is advantageous to do so.

Broadly speaking, a system is contemplated comprising an agent and a memory controller. The agent is configured to initiate a first transaction and to transmit a page hint indication during the first transaction. The page hint indication is indicative of whether or not a page addressed by the first transaction should be kept open. Coupled to receive the page hint indication, the memory controller is configured to selectively keep the page open in a memory coupled to the memory controller responsive to the page hint indication.

Additionally, an agent is contemplated. The agent comprises a circuit configured to initiate a first transaction and to transmit a page hint indication during the first transaction. The page hint indication is indicative of whether or not a page addressed by the first transaction should be kept open.

Moreover, a memory controller is contemplated, comprising a queue and a circuit coupled thereto. The queue is coupled to receive a first transaction and a page hint indication corresponding to the first transaction. The page hint indication is indicative of whether or not a page addressed by the first transaction should be kept open. The circuit is configured to communicate with a memory addressed by the first transaction, wherein the circuit is configured to selectively keep the page open in the memory responsive to the page hint indication.

Still further, a method is contemplated. A first transaction and a corresponding page hint indication are received. The page hint indication is indicative of whether or not a page addressed by the first transaction should be kept open. The page is selectively kept open responsive to the page hint indication.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

System Overview

Figure 1:
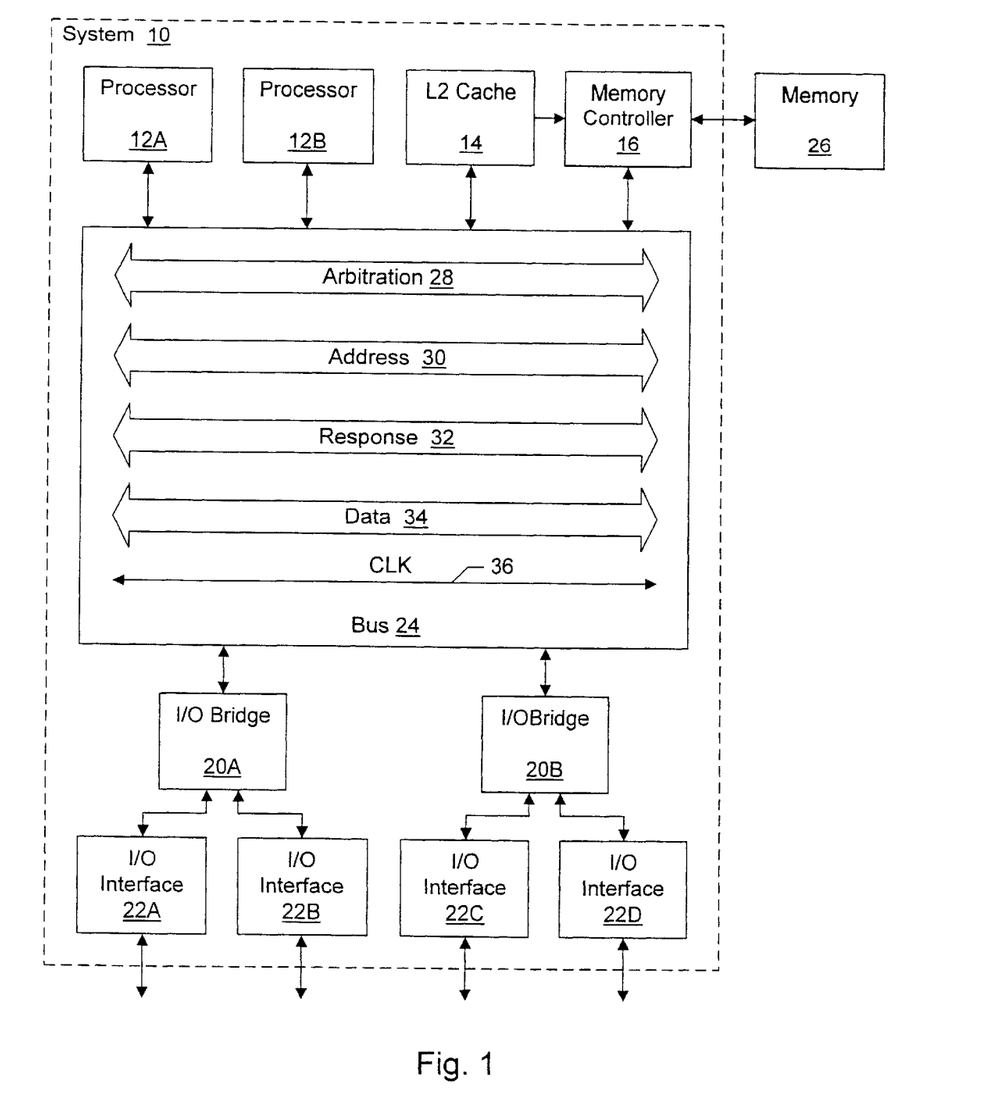
FIG. 1 is a block diagram of one embodiment of a system.

Turning now to FIG. 1, a block diagram of one embodiment of a system 10 is shown. Other embodiments are possible and contemplated. In the embodiment of FIG. 1, system 10 includes processors 12A–12B, an L2 cache 14, a memory controller 16, a pair of input/output (I/O) bridges 20A–20B, and I/O interfaces 22A–22D. System 10 may include a bus 24 for interconnecting the various components of system 10. More particularly, as illustrated in FIG. 1, bus 24 may include arbitration lines 28, an address bus 30, response lines 32, a data bus 34, and a clock line or lines 36. As illustrated in FIG. 1, each of processors 12A–12B, L2 cache 14, memory controller 16, and I/O bridges 20A–20B are coupled to bus 24. Thus, each of processors 12A–12B, L2 cache 14, memory controller 16, and I/O bridges 20A–20B may be an agent on bus 24 for the illustrated embodiment. More particularly, each agent may be coupled to clock line(s) 36 and to the conductors within bus 24 that carry signals which that agent may sample and/or drive. I/O bridge 20A is coupled to I/O interfaces 22A–22B, and I/O bridge 20B is coupled to I/O interfaces 22C–22D. L2 cache 14 is coupled to memory controller 16, which is further coupled to a memory 26.

Generally speaking, agents may participate in transactions on bus 24. As used herein, the term "agent" refers to a device which is capable of communicating on the bus. The agent may be a requesting agent if the agent is capable of initiating transactions on the bus and may be a responding agent if the agent is capable of responding to a transaction initiated by a requesting agent. A given agent may be capable of being both a requesting agent and a responding agent. Additionally, a "transaction" is a communication on the bus. The transaction may include an address transfer and optionally a data transfer. Transactions may be read transactions (transfers of data from the responding agent to the requesting agent) and write transactions (transfers of data from the requesting agent to the responding agent). Transactions may further include various coherency commands which may or may not involve a transfer of data.

Transactions on bus 24 may target memory locations in memory 26 ("memory transactions"). Memory controller 16 is the responding agent for memory transactions, unless the memory transactions hit in L2 cache 14, in which case L2 cache 14 may be the responding agent. Other embodiments may not include L2 cache 14 and memory controller 16 may be the responding agent for all memory transactions.

Memory transactions may include a page hint indication. The page hint indication is transmitted during the transaction by the requesting agent, and may be an indication of whether or not the page addressed by the transaction should be kept open or closed. In other words, the indication may be a hint by the requesting agent regarding the closing or keeping open of the page. For example, an agent may indicate that the page should be kept open if an additional transaction or transactions within the same page of memory are likely. A requesting agent may, for example, be performing several transactions to access a block of data larger than the data size transferable in one transaction, and thus may soon be performing additional transactions to access the entire block of data. A requesting agent may include a queue of outgoing transactions, and the requesting agent may examine the queue to determine if additional transactions are queued which are in the same page as a transaction being initiated. A requesting agent may be in a state in which it is likely that additional transactions not currently queued are going to be queued (e.g. a processor detecting that it is in a loop and thus additional transactions to nearby addresses may be generated in subsequent iterations of the loop). In any of these cases and others, the requesting agent may indicate, via the page hint indication, that the page should be kept open. The additional transactions may experience page mode hit latencies. In other cases, the agent may indicate that the page should be closed. Additional transactions to other pages may not experience the latency required to close the page, if the page is closed in response to the hint. System 10 may experience reduced overall memory latency due to the more efficient use of page mode.

Memory controller 16 may receive the page hint indication. When accessing the storage location(s) in response to the memory transaction, memory controller 16 may close the page or keep the page open responsive to the page hint indication. Thus, fine grain control of which pages are kept open and which pages are closed may be provided. That is, each requesting agent may indicate, on a transaction by transaction basis, whether given pages should be kept open or closed. Since the requesting agent may have some information about whether or not additional transactions are likely to that page and may transmit a page hint indication accordingly, pages may more often be kept open when it would be advantageous to do so, and may more often be closed when it is advantageous to do so.

In one embodiment, the page hint indication may be transmitted during the address phase of the transaction. Other embodiments may transmit the page hint indication during the data phase, or at any other point in the transaction. The page hint indication may be a signal, in one embodiment, which may be asserted to indicate that the page should be kept open. The signal may be deasserted to indicate that the page should be closed. In other embodiments, the page hint may be encoded into the command signals on bus 24 (e.g. the command signals transmitted during the address phase) or transmitted in any other suitable fashion from the requesting agent to memory controller 16.

Bus 24 may be a split transaction bus in the illustrated embodiment. A split transaction bus splits the address and data portions of each transaction and allows the address portion (referred to as the address phase) and the data portion (referred to as the data phase) to proceed independently. In the illustrated embodiment, the address bus 30 and data bus 34 are independently arbitrated for (using signals on arbitration lines 28). Each transaction including both address and data thus includes an arbitration for the address bus 30, an address phase on the address bus 30, an arbitration for the data bus 34, and a data phase on the data bus 34. Additionally, coherent transactions may include a response phase on response lines 32 for communicating coherency information after the address phase. Additional details regarding one embodiment of bus 24 are provided further below. The bus clock signal CLK on clock line(s) 36 defines the clock cycle for bus 24.

Bus 24 may be pipelined. Bus 24 may employ any suitable signalling technique. For example, in one embodiment, differential signalling may be used for high speed signal transmission. Other embodiments may employ any other signalling technique (e.g. TTL, CMOS, GTL, HSTL, etc.).

Processors 12A–12B may be designed to any instruction set architecture, and may execute programs written to that instruction set architecture. Exemplary instruction set architectures may include the MIPS instruction set architecture (including the MIPS-3D and MIPS MDMX application specific extensions), the IA-32 or IA-64 instruction set architectures developed by Intel Corp., the PowerPC instruction set architecture, the Alpha instruction set architecture, the ARM instruction set architecture, or any other instruction set architecture.

L2 cache 14 is a high speed cache memory. L2 cache 14 is referred to as "L2" since processors 12A–12B may employ internal level 1 ("L1") caches. If L1 caches are not included in processors 12A–12B, L2 cache 14 may be an L1 cache. Furthermore, if multiple levels of caching are included in processors 12A–12B, L2 cache 14 may be an outer level cache than L2. L2 cache 14 may employ any organization, including direct mapped, set associative, and fully associative organizations. In one particular implementation, L2 cache 14 may be a 512 kilobyte, 4 way set associative cache having 32 byte cache lines. A set associative cache is a cache arranged into multiple sets, each set comprising two or more entries. A portion of the address (the "index") is used to select one of the sets (i.e. each encoding of the index selects a different set). The entries in the selected set are eligible to store the cache line accessed by the address. Each of the entries within the set is referred to as a "way" of the set. The portion of the address remaining after removing the index (and the offset within the cache line) is referred to as the "tag", and is stored in each entry to identify the cache line in that entry. The stored tags are compared to the corresponding tag portion of the address of a memory transaction to determine if the memory transaction hits or misses in the cache, and is used to select the way in which the hit is detected (if a hit is detected).

Memory controller 16 is configured to access memory 26 in response to memory transactions received on bus 24. Memory controller 16 receives a hit signal from L2 cache 14, and if a hit is detected in L2 cache 14 for a memory transaction, memory controller 16 does not respond to that memory transaction. If a miss is detected by L2 cache 14, or the memory transaction is non-cacheable, memory controller 16 may access memory 26 to perform the read or write operation. Memory controller 16 may be designed to access any of a variety of types of memory. For example, memory controller 16 may be designed for synchronous dynamic random access memory (SDRAM), and more particularly double data rate (DDR) SDRAM. Alternatively, memory controller 16 may be designed for DRAM, Rambus DRAM (RDRAM), SRAM, or any other suitable memory device.

I/O bridges 20A–20B link one or more I/O interfaces (e.g. I/O interfaces 22A–22B for I/O bridge 20A and I/O interfaces 22C–22D for I/O bridge 20B) to bus 24. I/O bridges 20A–20B may serve to reduce the electrical loading on bus 24 if more than one I/O interface 22A–22B is bridged by that I/O bridge. Generally, I/O bridge 20A performs transactions on bus 24 on behalf of I/O interfaces 22A–22B and relays transactions targeted at an I/O interface 22A–22B from bus 24 to that I/O interface 22A–22B. Similarly, I/O bridge 20B generally performs transactions on bus 24 on behalf of I/O interfaces 22C–22D and relays transactions targeted at an I/O interface 22C–22D from bus 24 to that I/O interface 22C–22D. In one implementation, I/O bridge 20A may be a bridge to a PCI interface (e.g. I/O interface 22A) and to a Lightning Data Transport (LDT) I/O fabric developed by Advanced Micro Devices, Inc (e.g. I/O interface 22B). Other I/O interfaces may be bridged by I/O bridge 20B. Other implementations may bridge any combination of I/O interfaces using any combination of I/O bridges. I/O interfaces 22A–22D may include one or more serial interfaces, Personal Computer Memory Card International Association (PCMCIA) interfaces, Ethernet interfaces (e.g. media access control level interfaces), Peripheral Component Interconnect (PCI) interfaces, LDT interfaces, etc.

It is noted that system 10 (and more particularly processors 12A–12B, L2 cache 14, memory controller 16, I/O interfaces 22A–22D, I/O bridges 20A–20B and bus 24 may be integrated onto a single integrated circuit as a system on a chip configuration. In another configuration, memory 26 may be integrated as well. Alternatively, one or more of the components may be implemented as separate integrated circuits, or all components may be separate integrated circuits, as desired. Any level of integration may be used.

It is noted that, while the illustrated embodiment employs a split transaction bus with separate arbitration for the address and data buses, other embodiments may employ non-split transaction buses arbitrated with a single arbitration for address and data and/or a split transaction bus in which the data bus is not explicitly arbitrated. Either a central arbitration scheme or a distributed arbitration scheme may be used, according to design choice.

It is noted that, while FIG. 1 illustrates I/O interfaces 22A–22D coupled through I/O bridges 20A–20B to bus 24, other embodiments may include one or more I/O interfaces directly coupled to bus 24, if desired.

Figure 2:
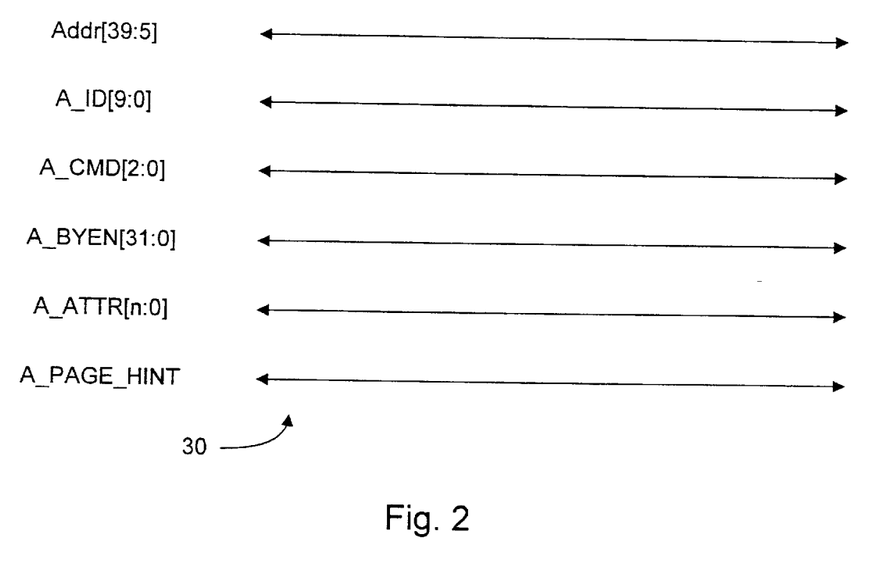
FIG. 2 is a block diagram of one embodiment of an address portion of a bus shown in FIG. 1.

Turning next to FIG. 2, a block diagram illustrating exemplary signals which may be included on address bus 30 is shown. Other embodiments are possible and contemplated. In the illustrated embodiment, address bus 30 includes address lines used to provide the address of the transaction (Addr[39:5]) and a set of byte enables (A_BYEN[31:0]) indicating which bytes on the data bus 34 are being read or written during the transaction, a command (A_CM[2:0]) used to indicate the transaction to be performed (read, write, etc.), a transaction ID (A_ID[9:0]) used to identify the transaction, a set of attributes (A_ATTR [n:0]), and a page hint signal (A_PAGE_HINT).

The transaction ID may be used to link the address and data phases of the transaction. More particularly, the responding agent may use the value provided on the transaction ID as the transaction ID for the data phase. Accordingly, the transaction ID may be a tag for the transaction. A portion of the transaction ID is an agent identifier identifying the requesting agent. For example, the agent identifier may be bits 9:6 of the transaction ID. Each agent is assigned a different agent identifier.

The set of attributes may include any set of additional attributes that it may be desirable to transmit in the address phase. For example, the attributes may include a cacheability indicator indicating whether or not the transaction is cacheable within the requesting agent, a coherency indicator indicating whether or not the transaction is to be performed coherently, and a cacheability indicator for L2 cache 14. Other embodiments may employ more, fewer, or other attributes, as desired.

The page hint signal may be used to transmit the page hint indication for the transaction. The signal may be asserted to indicate that the page should be kept open and deasserted to indicate that the page should be closed, or vice versa. Thus, the page hint signal may be shared among multiple agents coupled to bus 24. Generally, a signal may be defined to be asserted when it is at a low voltage (i.e. "active low") or when it is at a high voltage ("active high"). For differential signals, a signal may be asserted for one difference between the differential pair and deasserted for the other difference. As mentioned above, other embodiments may encode the page hint indication into the command signals (A_CMD). Other embodiments may encode the page hint indication into the attributes (A_ATTR).

Memory Controller

Figure 3:
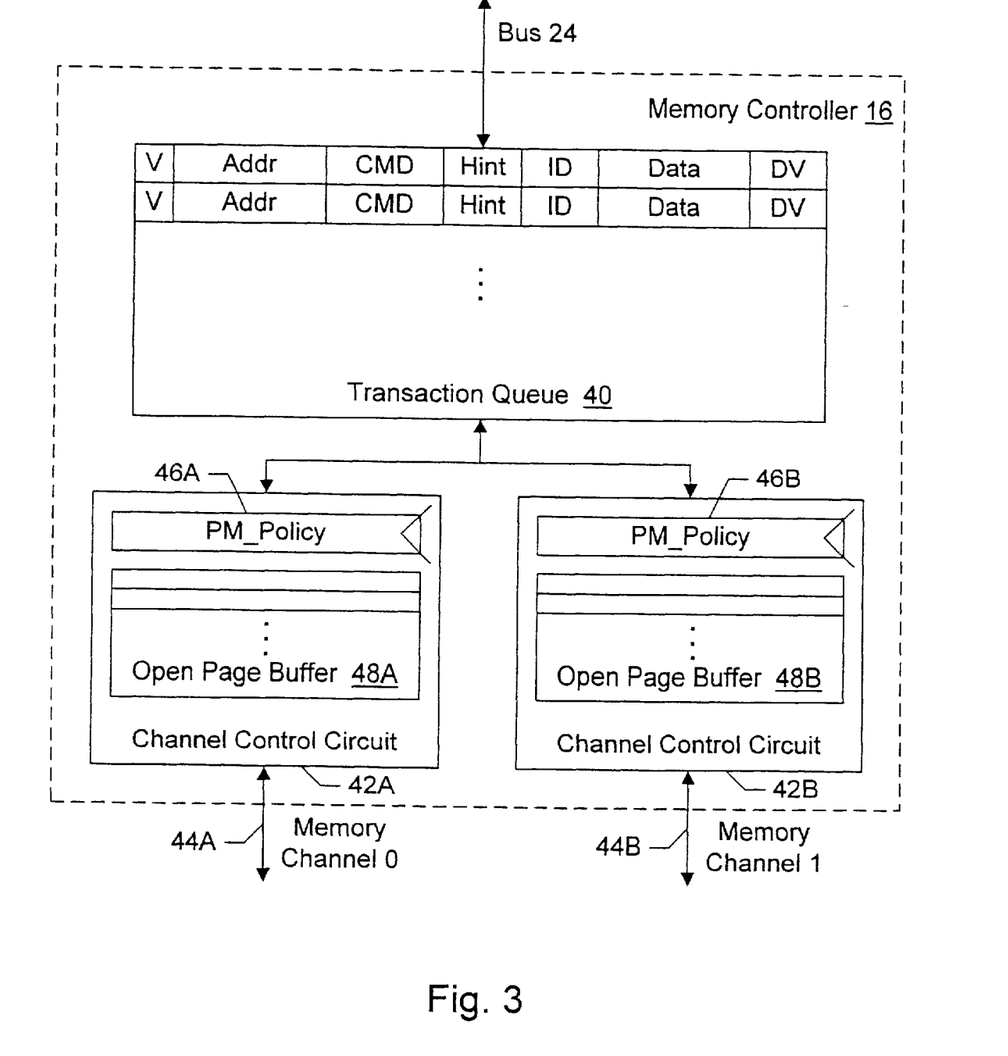
FIG. 3 is a block diagram of one embodiment of a memory controller.

Turning next to FIG. 3, a block diagram of one embodiment of memory controller 16 is shown. Other embodiments are possible and contemplated. In the embodiment of FIG. 3, memory controller 16 includes a transaction queue 40 and channel control circuits 42A–42B. Transaction queue 40 is coupled to communicate on bus 24 and is coupled to channel control circuits 42A–42B. Each of channel control circuits 42A–42B is coupled to a respective memory channel 44A–44B. Channel control circuit 42A includes a configuration register 46A and an open page buffer 48A. Channel control circuit 42B similarly includes a configuration register 46B and an open page buffer 48B.

Transaction queue 40 includes multiple entries, each entry configured to store information corresponding to a transaction. Transaction queue 40 may include control circuitry which allocates entries to memory transactions initiated on bus 24. Transaction queue 40 captures transaction information for memory transactions from bus 24 into the allocated entries. For example, in FIG. 3, several fields are illustrated for two exemplary entries within transaction queue 40. The fields include a valid bit, the address of the transaction, the command field, the page hint indication, the transaction ID of the transaction, the data for the transaction, and a data valid bit. Other embodiments may store different, additional, or alternative information for each transaction.

Control circuitry in transaction queue 40 dispatches transactions to one of channel control circuits 42A–42B for access to memory 26. In the illustrated embodiment, memory 26 is divided into two portions accessed by independent channels 44A–44B. Other embodiments may have more or fewer channels. The memory address range is mapped onto the channels (and may be mapped to multiple chip selects on a channel, etc.) via configuration registers, not shown. Thus, based on the address of the transaction, the control circuitry may determine to which channel control circuit 42A–42B the transaction is dispatched.

The channel control circuit 42A–42B receiving the transaction interfaces with the memory coupled to the corresponding memory channel, and performs the read or write specified by the transaction. Generally, interfacing with the memory may include transmitting the row address, transmitting the column address, and transmitting or receiving the data. Additionally, the channel control circuit 42A–42B may either keep the page addressed by the transaction open or close the page. As used herein, a page is referred to as "addressed" by a transaction if the row address of the transaction is the row address corresponding to that page. Channel control circuit 42A–42B receives the page hint indication corresponding to the transaction, and may keep the page open or close the page based on the page hint indication.

In one embodiment, channel control circuits 42A–42B may be programmable (via configuration registers 46A–46B) with a page mode policy. The available page mode policies include a hint policy in which the page hint indication supplied in the transaction is used to determine if the page is kept open or closed. Other page mode policies may be implemented, as desired, in which the page hint indication may or may not be used. For example, in one embodiment, a close page policy and a CAS time check policy may be implemented. In the close page policy, the page is closed after each transaction and the page hint indication is not used. In the CAS time check policy, the channel control circuit 42A–42B checks transaction queue 40 at the time the column address for the transaction is to be transmitted to determine if another transaction to the same page is queued. If so, the page may be kept open. Otherwise, the page may be closed. The CAS time check policy may not use the page hint indication. On the other hand, the CAS time check policy may use the page hint indication to determine to keep the page open if no transactions to the same page are queued but the page hint indication indicates that the page should be kept open.

In one embodiment, multiple chip selects may be supported on each memory channel. The chip selects may be coupled to different memory chips or modules (e.g. dual in line memory modules, or DIMMs) and may select the chips or modules to respond to a given memory transaction. The page mode policy programmed in the configuration registers 46A–46B may include a separate policy for each chip select, so that the policy may be varied on a chip select basis (i.e.

one chip select may be set to one page mode policy, another chip select may be set to a different page mode policy, etc.). Additionally, the page mode policies for each channel may be different by programming the corresponding configuration registers 46A–46B appropriately. Generally, configuration registers 46A–46B may be visible to software (e.g. instructions executing on processors 12A–12B) so that they may be programmed by software. For example, configuration registers 46A–46B may be mapped to certain addresses within the address range available on bus 24, and load and store instructions to those addresses may be used to read and write configuration registers 46A–46B.

Channel control circuits 42A–42B may use open page buffers 48A–48B to track the pages which are currently open on the corresponding memory channels 44A–44B. Open page buffers 48A–48B may include a buffer entry for each memory section which can concurrently have an open page (e.g. each bank of each chip select, or each chip select, depending on the configuration). The entry may indicate whether or not a page is open, and indicate the page (e.g. by storing the row address). Before performing any activity corresponding to a transaction on the memory channel 44A–44B, the channel control circuit 42A–42B may check open page buffer 48A–48B to determine if the page is already open. If so, the channel control circuit 42A–42B may proceed with transmitting the column address of the transaction (e.g. with a read or write command in an SDRAM, or by asserting the column address strobe (CAS) in an asynchronous DRAM) without transmitting the row address of the transaction. If the page is not already open, and another page is open in the memory to be accessed (e.g. in the same bank and chip select, for SDRAM, or in the same chip select, for asynchronous DRAM), then channel control circuit 42A–42B closes the open page and then proceeds with transmitting the row address of the transaction. If the page is not already open but the memory to be accessed does not have an open page, then channel control circuit 42A–42B proceeds with transmitting the row address of the transaction. If the channel control circuit 42A–42B keeps the page open after a transaction, the channel control circuit 42A–42B updates open page buffer 48A with the row address of the transaction.

In addition to closing pages when another page in the same memory section is to be opened, channel control circuits 42A–42B may close pages for other reasons as well. For example, if the memory section is due for a refresh, the page may be closed to that memory section.

It is noted that transaction queue 40 may be configured to invalidate a transaction if an L2 hit signal from L2 cache 14 is asserted during the transaction, for embodiments employing L2 cache 14. Some embodiments may employ an intervention protocol for coherent transactions, in which a coherent agent provides the data on bus 24 for a transaction if the coherent agent has sufficient ownership of the data (e.g. modified or exclusive). In such embodiments, transaction queue 40 may be configured to invalidate a transaction if a coherency agent is to supply the data.

Figure 4:
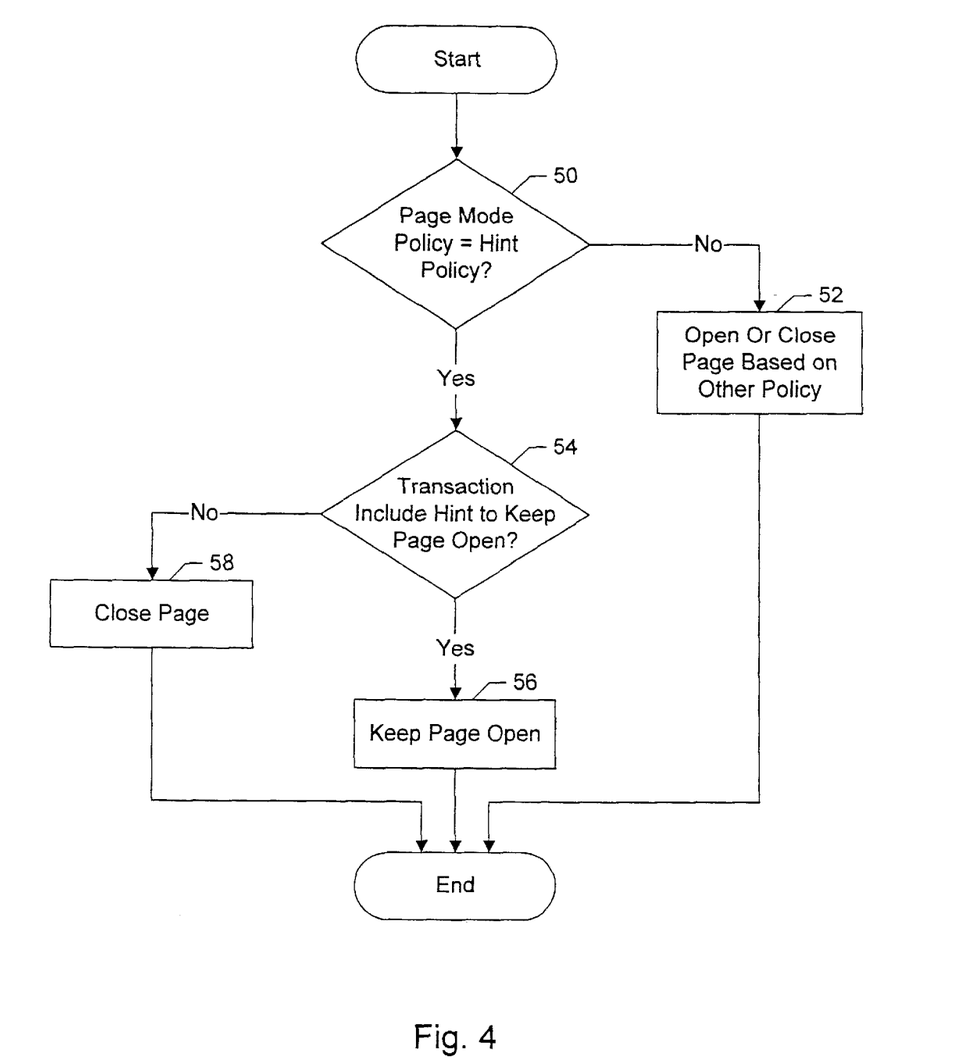
FIG. 4 is a flowchart illustrating operation of one embodiment of a channel control circuit shown in FIG. 3 during servicing of a transaction.

Turning next to FIG. 4, a flowchart illustrating operation of one embodiment of a channel control circuit 42A–42B determining whether or not to keep a page open during a memory access for a transaction is shown. Other embodiments are possible and contemplated. While the blocks shown in FIG. 4 are illustrated in a particular order for ease of understanding, any suitable order may be used. Furthermore, various blocks may be performed in parallel by combinatorial logic circuitry in channel control circuits 42A–42B.

Generally, the flowchart of FIG. 4 illustrates the determination of whether or not to keep a page open. This determination may be made at any time, in various embodiments. For example, some embodiments may make the determination at the time the column address is to be transmitted for the memory access corresponding to the transaction. This time may be suitable for SDRAM memory, since a page may be closed with an autoprecharge command as part of the read or write command transmitting the column address. Pages may also be closed with an explicit precharge command sent separate from a read or write command, as may be done if a page is kept open and is later closed to open a different page or to refresh the corresponding memory section. For asynchronous DRAMs, the page may be closed by deasserting the RAS signal. Other suitable times during the memory access that may be suitable for determining whether to keep the page open or close the page may include the beginning of the memory access (when the transaction is dispatched to channel control circuit 42A–42B), etc.

The channel control circuit 42A–42B may determine if the page mode policy in the configuration register 46A–46B is the page hint policy in which the page hint indication included in the transaction is used to determine whether the page is kept open or closed (decision block 50). If the page mode policy is not the page hint policy, then the channel control circuit 42A–42B may determine to keep the page open or close the page based on the selected policy (block 52). Exemplary policies have been described above, although any set of page mode policies may be employed.

If the page mode policy is the page hint policy, channel control circuit 42A–42B examines the page hint indication from the corresponding transaction to determine if the page should be kept open or closed (decision block 54). If the page hint indication indicates that the page should be kept open, the channel control circuit 42A–42B keeps the page open (block 56). If the page hint indication indicates that the page should be closed, the page is closed (block 58).

Figure 5:
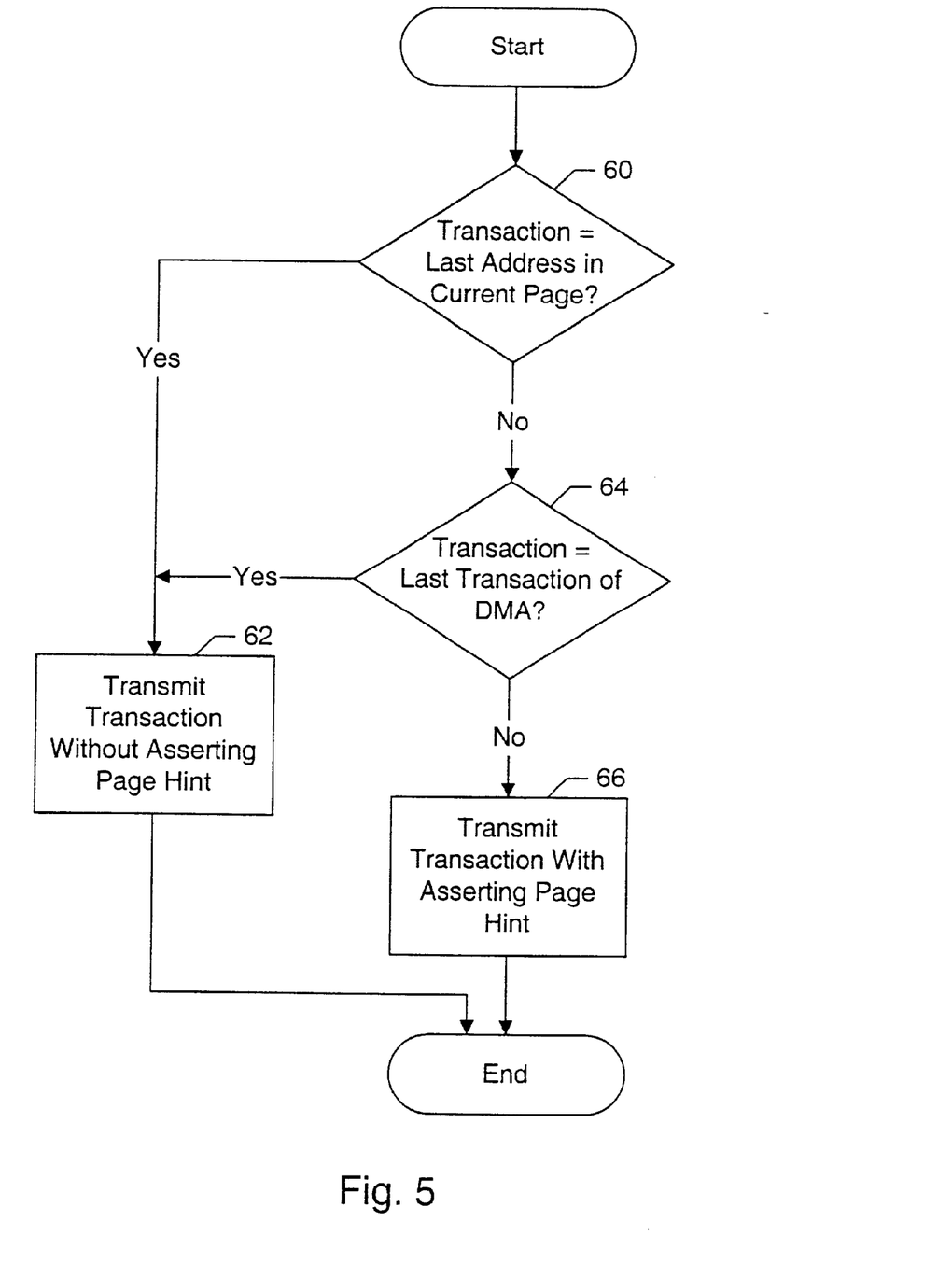
FIG. 5 is a flowchart illustrating operation of one embodiment of a DMA agent.

Turning now to FIG. 5, a flowchart is shown illustrating operation of an exemplary agent for determining the page hint indication for a transaction. More particularly, the page hint indication may be a signal in the illustrated embodiment, asserted to indicate the page should be kept open and deasserted to indicate that the page should be closed. As mentioned above, other embodiments may transmit the page hint indication in other fashions, and a similar flowchart to the flowchart of FIG. 5 may be used. The exemplary agent for FIG. 5 is performing a series of transactions for a direct memory access (DMA). The agent may be a DMA engine, or may be, for example, one of I/O bridges 20A–20B relaying DMA transactions from a device on an I/O interface 22A–22D. Other embodiments are possible and contemplated. In the embodiment of FIG. 5, various blocks are illustrated in a particular order for ease of understanding. However, any order may be used. Furthermore, blocks may be performed in parallel by combinatorial logic circuitry within the agent.

If the transaction is the last in the series of transactions to address a particular page (decision block 60), then the agent may transmit the transaction with the page hint signal deasserted (block 62). Generally, in a DMA, the series of transactions include consecutive addresses. Thus, a subset of the series of transactions may address a particular page, followed by an additional subset of transactions to a different page. Accordingly, it may be advantageous to close the page when the last transaction addressing that page is transmitted, to reduce latency if the newly addressed page is in the same memory section (or to reduce latency for some other transaction to that memory section). It is noted that to perform the decision of block 60, the agent includes knowledge of which portion of the transaction addresses are used to form the row address. Other embodiments may not include the decision of block 60, if desired, and thus may assert the page hint signal for each transaction in the DMA subject to decision block 64 described below.

If the transaction is the last transaction of the DMA (decision block 64), the agent may transmit the transaction with the page hint signal deasserted (block 62). Since the transaction is the last transaction, the agent may not be aware of any additional transactions addressing the same page. Thus, it may be advantageous to close the page to reduce latency for other transactions to that memory section.

If the transaction is not the last transaction of the DMA (and optionally is not the last address in the current page), the agent may transmit the transaction with the page hint signal asserted (block 66). In this case, the agent is aware of additional transactions to the same page, and thus it may be advantageous to keep the page open to reduce the latency of those additional transactions.

Figure 6:
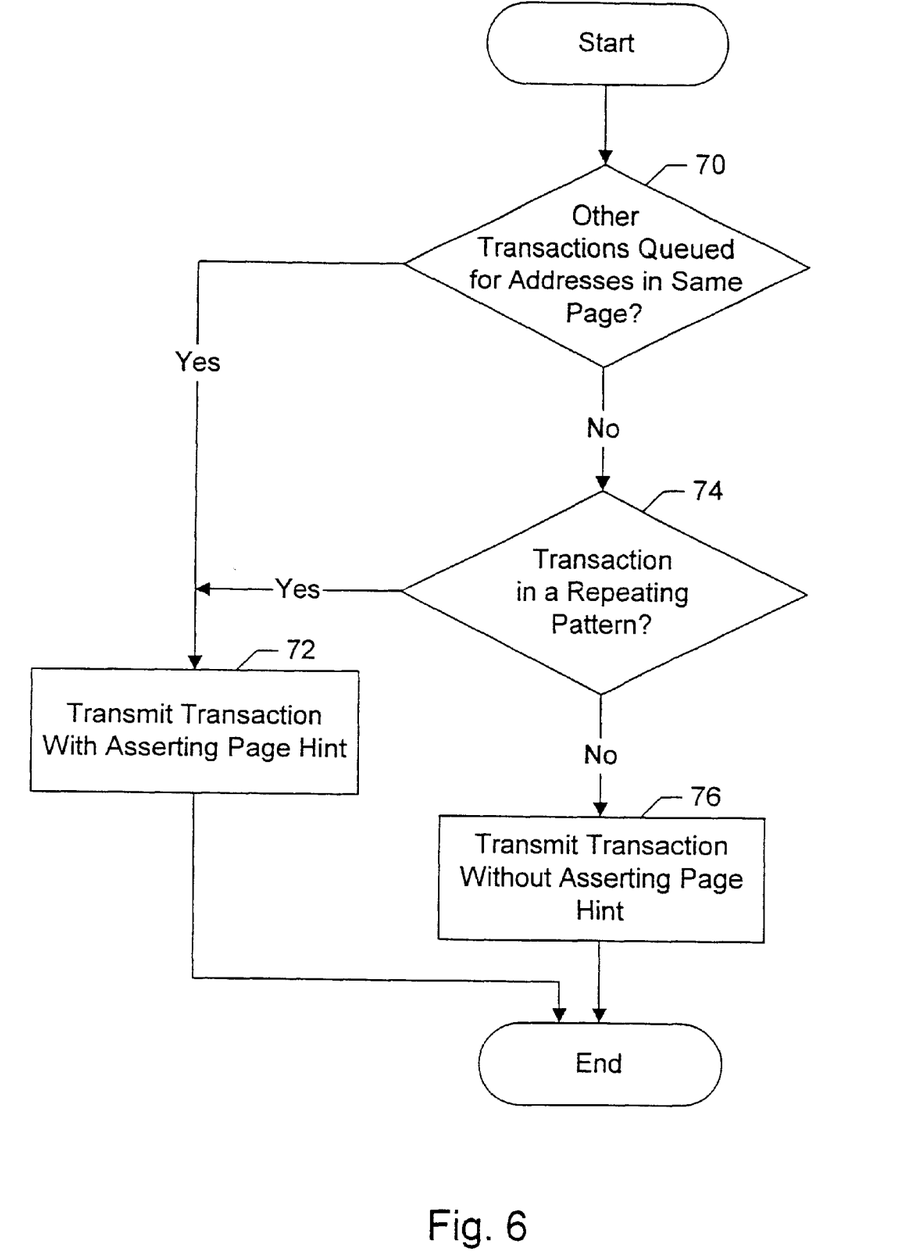
FIG. 6 is a flowchart illustrating operation of one embodiment of a processor agent.

Turning now to FIG. 6, a flowchart is shown illustrating operation of another exemplary agent for determining the page hint indication for a transaction. More particularly, the page hint indication may be a signal in the illustrated embodiment, asserted to indicate the page should be kept open and deasserted to indicate that the page should be closed. As mentioned above, other embodiments may transmit the page hint indication in other fashions, and a similar flowchart to the flowchart of FIG. 6 may be used. The exemplary agent for FIG. 6 may be a processor agent (e.g. processors 12A or 12B in FIG. 1). Other types of agents may employ similar operation, as desired. In the embodiment of FIG. 6, various blocks are illustrated in a particular order for ease of understanding. However, any order may be used. Furthermore, blocks may be performed in parallel by combinatorial logic circuitry within the agent.

A processor agent may include a queue of transactions to be transmitted on bus 24. The processor agent may search the queue to determine if other transactions addressing the same page are queued (decision block 70). If additional transactions are queued, the transaction may be transmitted with the page hint signal asserted (block 72). For example, the processor agent may use the result of searching the queue, in the clock cycle that arbitration is won by the processor agent to perform the address phase of the transaction, to assert or deassert the page hit signal.

A processor agent may also be configured to determine if a repeating pattern of transactions is likely. For example, a processor agent may detect that it is in a loop of code, and thus additional transactions to the same page(s) as current transactions may be more likely than if a loop were not being executed. If the processor agent detects a repeating pattern of transactions (decision block 74), then the processor agent may transmit the transaction with the page hint signal asserted (block 72) even if no other transactions to the same page as the transaction are queued. In other cases, the processor agent may transmit the transaction with the page hint signal deasserted (block 76).

While FIGS. 5 and 6 have illustrated use of the page hint indication by specific agents, any agent may use the page hint indication in any suitable fashion.

Figure 7:
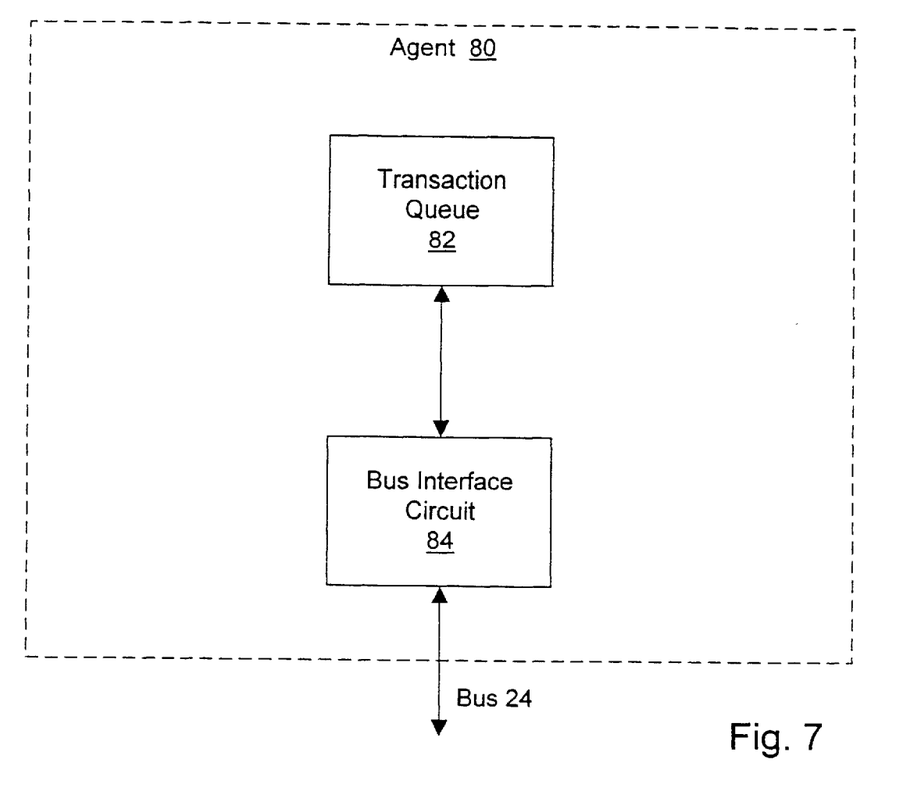
FIG. 7 is a block diagram of one embodiment of an agent.

FIG. 7 is a block diagram of an exemplary agent 80. Other embodiments are possible and contemplated. In the embodiment of FIG. 7, the agent 80 includes a transaction queue 82 coupled to a bus interface circuit 84. The bus interface circuit 84 is further coupled to bus 24.

Generally, transaction queue 82 may store transactions which are to be initiated by agent 80 on bus 24. Transaction queue 82 may receive transactions generated internally by agent 80 (e.g. a processor agent may generate transactions responsive to executing load and store instructions), or may receive the transactions from another external source (e.g. an I/O bridge 20A–20B may receive transactions from devices attached to I/O interfaces 22A–22D).

Bus interface circuit 84 includes the circuitry for interfacing to bus 24. More particularly, bus interface circuit 84 may transmit transactions on bus 24, including the assertion or deassertion of the page hint signal during the address phase of the transactions.

Figure 8:
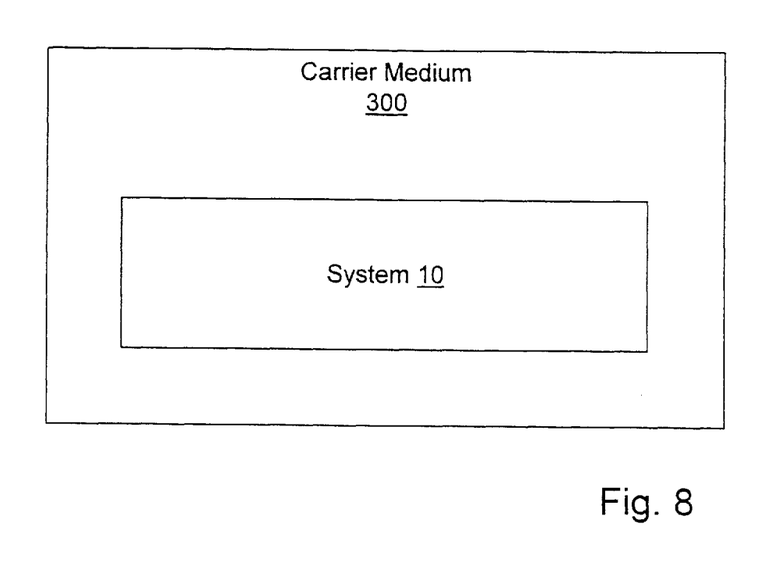
FIG. 8 is a block diagram of one embodiment of a carrier medium.

Turning next to FIG. 8, a block diagram of a carrier medium 300 including a database representative of system 10 is shown. Generally speaking, a carrier medium may include storage media such as magnetic or optical media, e.g., disk or CD-ROM, volatile or non-volatile memory media such as RAM (e.g. SDRAM, RDRAM, SRAM, etc.), ROM, etc., as well as transmission media or signals such as electrical, electromagnetic, or digital signals, conveyed via a communication medium such as a network and/or a wireless link.

Generally, the database of system 10 carried on carrier medium 300 may be a database which can be read by a program and used, directly or indirectly, to fabricate the hardware comprising system 10. For example, the database may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising system 10. The netlist may then be placed and routed to produce a data set describing geometric shapes to be applied to masks. The masks may then be used in various semiconductor fabrication steps to produce a semiconductor circuit or circuits corresponding to system 10. Alternatively, the database on carrier medium 300 may be the netlist (with or without the synthesis library) or the data set, as desired.

While carrier medium 300 carries a representation of system 10, other embodiments may carry a representation of any portion of system 10, as desired, including any combination of an agent, a memory controller, a bus, memory, etc.

Numerous variations and modifications will become apparent to those skilled in the art once the above disclosure is fully appreciated. It is intended that the following claims be interpreted to embrace all such variations and modifications.

What is claimed is:

1. A memory controller comprising:
a first channel control circuit configured to couple to a first channel to which a first portion of a memory is coupled, wherein the first channel control circuit is configureable to operate according to a first page mode policy with regard to memory accesses on the first channel; and
a second channel control circuit configured to couple to a second channel to which a second portion of the memory is coupled, wherein the second channel control circuit is configureable to operate according to a second page mode policy with regard to memory accesses on the second channel;
wherein the first page mode policy and the second page mode policy are separately configureable.

2. The memory controller as recited in claim 1 wherein the first page mode policy differs from the second page mode policy during use.

3. The memory controller as recited in claim 1 wherein the first channel control circuit comprises a first configuration register programmable with the first page mode policy, and wherein the second channel control circuit comprises a second configuration register programmable with the second page mode policy.

4. The memory controller as recited in claim 1 wherein the first channel includes a plurality of chip selects, and wherein the first page mode policy comprises a plurality of chip select page mode policies, each of the plurality of chip select page mode policies applicable to a different one of the plurality of chip selects.

5. The memory controller as recited in claim 4 wherein at least one of the plurality of chip select page mode policies differs from other ones of the plurality of chip select page mode policies during use.

6. The memory controller as recited in claim 1 wherein the first page mode policy and the second page mode policy are each one of a plurality of page mode policies supported by the memory controller, wherein a first one of the plurality of page mode policies is to use a page hint indication received by the memory controller with a memory request to determine whether or not to close a page accessed in response to the memory request.

7. The memory controller as recited in claim 6 wherein a second one of the plurality of page mode policies comprises a close page policy in which the page is closed after access in response to the memory request.

8. The memory controller as recited in claim 6 wherein a second one of the plurality of page mode policies comprises determining whether or not to keep the page open in response to additional memory requests queued by the memory controller at a point in time that a column address corresponding to the memory request is transmitted to the memory.

9. The memory controller as recited in claim 8 wherein the page hint indication is also used in the second one of the plurality of page mode policies.

10. A method comprising:
configuring a first channel control circuit to operate according to a first page mode policy with regard to memory accesses on a first channel, wherein the first channel control circuit is configured to couple to the first channel to which a first portion of a memory is coupled; and
separately configuring a second channel control circuit to operate according to a second page mode policy with regard to memory accesses on a second channel, wherein the second channel control circuit is configured to couple to a second channel to which a second portion of the memory is coupled.

11. The method as recited in claim 10 wherein the first page mode policy differs from the second page mode policy.

12. The method as recited in claim 10 wherein the first channel includes a plurality of chip selects, and wherein the first page mode policy comprises a plurality of chip select page mode policies, each of the plurality of chip select page mode policies applicable to a different one of the plurality of chip selects, and wherein the configuring the first channel control circuit comprises configuring each of the plurality of chip select page mode policies.

13. The method as recited in claim 12 wherein at least one of the plurality of chip select page mode policies differs from other ones of the plurality of chip select page mode policies.

14. A carrier medium comprising a database that is operated upon by a program executable by a computer system, the program operating upon the database to perform a portion of a process to manufacture an integrated circuit including circuitry described by the database, the circuitry described in the database including a memory controller comprising:
a first channel control circuit configured to couple to a first channel to which a first portion of a memory is coupled, wherein the first channel control circuit is configureable to operate according to a first page mode policy with regard to memory accesses on the first channel; and
a second channel control circuit configured to couple to a second channel to which a second portion of the memory is coupled, wherein the second channel control circuit is configureable to operate according to a second page mode policy with regard to memory accesses on the second channel;
wherein the first page mode policy and the second page mode policy are separately configureable.

15. The carrier medium as recited in claim 4 wherein the first page mode policy differs from the second page mode policy during use.

16. The carrier medium as recited in claim 14 wherein the first channel includes a plurality of chip selects, and wherein the first page mode policy comprises a plurality of chip select page mode policies, each of the plurality of chip select page mode policies applicable to a different one of the plurality of chip selects.

17. The carrier medium as recited in claim 16 wherein at least one of the plurality of chip select page mode policies differs from other ones of the plurality of chip select page mode policies during use.

18. The carrier medium as recited in claim 14 wherein the first page mode policy and the second page mode policy are each one of a plurality of page mode policies supported by the memory controller, wherein a first one of the plurality of page mode policies is to use a page hint indication received by the memory controller with a memory request to determine whether or not to close a page accessed in response to the memory request.

19. The carrier medium as recited in claim 18 wherein a second one of the plurality of page mode policies comprises a close page policy in which the page is closed after access in response to the memory request.

20. The carrier medium as recited in claim 18 wherein a second one of the plurality of page mode policies comprises determining whether or not to keep the page open in response to additional memory requests queued by the memory controller at a point in time that a column address corresponding to the memory request is transmitted to the memory.

21. The carrier medium as recited in claim 20 wherein the page hint indication is also used in the second one of the plurality of page mode policies.

* * * * *